United States Patent [19]
McKenna et al.

[11] Patent Number: 5,971,762
[45] Date of Patent: Oct. 26, 1999

[54] BEAD-BASED DROP ART BOOK

[76] Inventors: Paul A. McKenna; Catherine L. Lipton, both of 2 Canal Rd., Princeton, N.J. 08540

[21] Appl. No.: 09/247,475

[22] Filed: Feb. 8, 1999

[51] Int. Cl.[6] .................................................. G09B 11/00
[52] U.S. Cl. .............................. 434/81; 434/96; 434/98; 446/73; 446/147; 446/149; 40/406
[58] Field of Search ..................... 434/96, 189; 446/475, 446/147, 149, 151, 168, 71, 73; 273/122 R; 40/579, 406; 221/185, 239

[56] References Cited

U.S. PATENT DOCUMENTS

| | | | |
|---|---|---|---|
| D. 380,960 | 7/1997 | Blotsky | D9/333 |
| 1,014,759 | 1/1912 | Kovacs | 446/149 |
| 1,174,068 | 3/1916 | Hincks . | |
| 1,275,997 | 8/1918 | Adler . | |
| 1,299,274 | 4/1919 | Wehling . | |
| 1,363,570 | 12/1920 | Cotter . | |
| 2,315,240 | 3/1943 | Ashenberg et al. | 40/406 |
| 2,752,725 | 7/1956 | Unsworth | 46/1 |
| 3,117,394 | 1/1964 | Wenger | 46/41 |
| 3,630,172 | 12/1971 | Neumann | 116/215 |
| 4,169,323 | 10/1979 | Engel | 35/26 |
| 4,320,157 | 3/1982 | von Hagens | 428/13 |
| 4,474,558 | 10/1984 | Quercetti | 434/189 |
| 4,662,846 | 5/1987 | Quercetti | 434/96 |
| 4,667,848 | 5/1987 | Gold | 221/155 |
| 5,673,813 | 10/1997 | Russell | 221/203 |
| 5,704,789 | 1/1998 | Yang | 434/96 |
| 5,730,293 | 3/1998 | Kelly et al. | 206/575 |

*Primary Examiner*—Robert A. Hafer
*Assistant Examiner*—Bena B. Miller
*Attorney, Agent, or Firm*—Kenneth P. Glynn, Esq.

[57] ABSTRACT

The present invention is a book having (a) a front cover, a back cover and a spline, forming an outer portion of a book; (b) a plurality of pages affixed within the outer portion of the book and containing a plurality of words constituting a text; (c) at least one page being a three-dimensional hollow frame structure with its front being at least partially made of see-through material. The frame structure is divided into an upper section and a lower section, separated by a wall having at least one connecting orifice, and containing a trap mechanism at each of said at the connecting orifice, and including a lever functionally connected to the trap mechanism. There is also a plurality of bead-like structures contained within the upper section of said frame structure, having a sufficient shape and size to flow via gravity through the connecting orifice of the upper section to the lower section when a user actuates the lever with the book in a substantially upright position.

20 Claims, 6 Drawing Sheets

BEAD-BASED DROP ART BOOK

BACKGROUND OF THE INVENTION

1. Field of the Invention

The present invention relates to toy books for children which have been developed to enhance play, education and manual skills. More specifically, one or more pages includes a frame structure with bead-like structures which may be released from an upper section to create an image.

2. Information Disclosure Statement

The following prior art patents are representative of bead-like structure containing toys:

U.S. Pat. No. 1,174,068 to Elizabeth T. Hincks describes a sand toy consisting of a flexible bag shaped to simulate a distinctive object, having a slit at the top, a flexible funnel attached to the margin of the slit, and co-extensive therewith, its flexibility adapting it for external and internal arrangement, for holding the object in upright position and for opening the slit, and for forming a closure therefor.

U.S. Pat. No. 1,275,997 to Milton D. Adler describes a toy comprising a card of suitable sheet material having a design cut therein, a backing sheet having an adhesive surface, a quantity of comminuted material sufficient to fill the design to the depth and thickness of the card whereby a replica of the design may be formed on said backing with the comminuted material by filling the design with the material and removing the surplus with the card.

U.S. Pat. No. 1,299,274 to Andrew H. Wehling describes in a toy, the combination with a substantially closed rectangular receptacle having sand therein and having a transparent face, a U-shaped frame having the connecting element from the arms thereof secured in the receptacle, a disk having a shaft journaled in bearings between the arms of the said U-shaped member, said disk having peripheral slits, blades inserted in said slits, a funnel-shaped member secured in the corner of the inner wall of the receptacle opposite that to which the U-shaped member is connected and designed to deliver the sand therefrom to the blades of the wheel, and said funnel-shaped member, at the upper and outer edge thereof being provided with a transverse opening forming an inlet for the receptacle.

U.S. Pat. No. 1,363,570 to Catherine L. Cotter describes an animal toy comprising a container for mobile material, such as water or sand, having two upright side members respectively corresponding to opposite sides of an animal, a transverse member connecting said side members and formed so as to cooperate therewith to hold said material, the transverse member at a place corresponding to the mouth of the animal having a discharge spout, each side member having a supporting foot corresponding to a foot of the animal, the transverse member being doubled upon itself to form a closed top having a filling opening, and a cover hinged to one end of said transverse member, in the closed position resting on the other end of said transverse member for closing said filling opening.

U.S. Pat. No. 2,752,725 to Robert K. Unsworth describes in a device of the character described, a pair of compartments, an elongated hollow connecting member between said compartments, a body of liquid within said compartments and said member having a predetermined density and a plurality of movable objects in said liquid, said elongated member having therewithin a coaxially aligned tubular member, one end which is outwardly flared and the other end of which is outwardly flared and then inwardly flared.

U.S. Pat. No. 3,117,394 to Richard Wenger describes in a display device or toy, a base housing having an opening in its top, a drawer disposed within the housing and means for withdrawing the drawer, the housing having a flat top, four posts extending upwardly from the base for supporting an overhead sand hopper and from which a gravitational flow of granular material is had, the hopper at its bottom being provided with a tubular outlet, a valve for closing the outlet, the valve being provided with a downwardly projecting lip and also with an upwardly extending wing portion, the wing portion adapted to engage an inverted U-shape spring member that is attached to the wall of the hopper, means for adjusting the tension of the spring whereby to limit the movement of the valve, the valve being normally closed, a swinging lever below the hopper, a hod carried at one end of the lever, the lever being balanced so that when the hopper is empty the hod bearing end of the lever will be elevated and the hod will be positioned adjacent to the bottom of the outlet of the hopper, the lever being pivotally supported upon a post, adjustable means disposed upon the post and whereby to limit a downward movement of the lever, an end of the lever having is articulated connection with a simulated operator, a pivoted dumping receptacle that is supported upon the top of the housing and arranged in the path of downward swing of the lever so that the hod deposits its contents into said receptacle during such downward swing, the receptacle being in the form of a barrow, the barrow being pivoted in a U-shape bracket to the top of the wall of the housing, the barrow being limited in its loading position by a spring stop, the barrow being provided with an adjustable weight whereby to secure the correct balance for the barrow and to vary the amount of material necessary to overbalance and dump the barrow, the barrow having a yoke-shaped handle that is pivotally connected to an articulated linkage and with the linkage being pivotally connected to the arms of a simulated workman, said adjustment of the movement of the valve serving to vary the quantity of granular material flowing from the hopper to the hod.

U.S. Pat. No. 4,169,323 to Robert W. Engel describes a sand art hobby craft kit which includes a plurality of substantially transparent tubes which preferably are parts of a unitary structure. The combination also includes a plurality of supplies of differently colored flowable media, preferably sand. There is the outline on the front face of the structure of a design that defines areas to be colored differently. The combination also includes means such as a base for supporting the tubes in vertical position with their upper ends open and for closing the lower ends of the tubes. A color indicia chart indicating the colors for each area also is provided. Color bearing flowable media other than sand may be provided, if desired. The color indicia chart may be a colored print of the final design such as a picture, or it may have each area of the picture color coded to the supplies of color bearing media.

U.S. Pat. No. 4,320,157 to Gunther von Hagens describes a method for preserving a large section of biological tissue with a curable polymer such as an acrylic resin by impregnating the large section with the polymer and pressing the impregnated large section between flat plates. These plates are is further separated near their edges by an elastomeric material, thereby providing a flat cell in which the opposing cut surfaces of the impregnated large section abut the inner surfaces of the cell plates. Thereafter the cell is filled up with uncured polymer. The polymer is then cured, the plates moving toward each other due to the polymer shrinkage during curing. Finally, the plates are removed. The resulting plastinated sheet is a permanently-preserved large section of biological tissue whose tissue water is completely replaced by a cured polymer, the sheet having a uniform thickness and smooth, even surfaces.

U.S. Pat. No. 4,662,846 to Alessandro Quercetti describes an apparatus for mechanically composing a mosaic pattern formed by balls, which comprises an inclined composition table subdivided by uniformly spaced protruding guides into a number of columns extending along the direction of the lines of maximum slope, each column having a width slightly larger than the diameter of a ball and a length several times larger than said diameter, a store of differently colored balls to be disposed into columns, situated at a level higher than that of the composition table, a reservoir for discharged balls, situated at a level lower then that of the composition table, a launching and column forming device actuable to direct each ball arriving from the upper store towards a preselected column of the composition table, a rejection device opening into the lower reservoir, a retaining device situated at the lower end of the columns of the composition table normally retain the balls contained in these columns and, on command, to let them roll down towards the lower reservoir, and a passage for the transfer of balls from the lower reservoir to the upper store.

U.S. Pat. No. 4,667,848 to Arthur Gold describes a machine for dispensing granular confectionery, such as gumballs, peanuts, and the like, which includes a housing, a container globe seated on the housing, a cap seated on the globe and a vertical standard extending interior of the housing and globe and including a threaded end. A retainer ring is seated on the globe with a gasket interposed. The inlet to the globe carries opposing deformations in the form of notches in the perimeter of the entrance opening of the globe. The retainer ring carries depending lugs seatable in the notches. The cap can be tightened onto the globe with the lugs seated in the notches so as to prevent relative rotation between the retainer ring and globe during tightening of the cap and thereby prevent possible damage to the globe, such as breaking or cracking it.

U.S. Pat. No. 5,673,813 to Douglas Raymond Russell describes a candy dispensing device uses an impeller to impart centrifugal force to a mass of candies held in the dispenser's housing. The swirling mass of candies may be a source of amusement to the user and may be used to dispense the candies through a spout. In one version of the invention, the dispensing device includes a handle and is sized to be portable by the user. The dispensing device uses a combination cap with two cap portions, one to cover the fill mouth, and the other to cover the spout.

U.S. Pat. No. 5,704,789 to Chie-Te Yang describes a bead drawing kit includes a plurality of beads and a drawing board. A bead setting tool having a container for holding a supply of beads and having a push rod for ejecting the beads may be used to set beads on the drawing board. The drawing board includes a base member, a holding plate, a positioning plate and a base cover. The base member has a looped upright surrounding wall and a horizontal base plate disposed in the surrounding wall. The base plate has a periphery connected to the surrounding wall and is formed with a plurality of lower holes that are arranged in rows and columns for passage of the beads therethrough. The holding plate is made of a resilient material and is provided on the base plate. The holding plate is formed with a plurality of slits, each of which is aligned with a respective one of the lower holes in the base plate and forms at least two resilient fins on the holding plate for holding releasably one of the beads. The positioning plate is secured to the base plate such that the holding plate is clamped between the base plate and the positioning plate. The positioning plate is formed with a plurality of upper holes that are aligned with the slits in the holding plate to permit entry of the beads into the slits. The base cover has a bottom plate and a looped peripheral wall which extends from the bottom plate and which engages removably the surrounding wall of the base member.

U.S. Pat. No. 5,730,293 to Michael J. Kelly, Brynda L. Kelly, Kari M. Kelly describes a product for use in creating sculpted shapes and features comprises a dry quantity of granular sand which is treated to retain its cohesiveness when submerged in water. A compressible receptacle contains the granular sand in a hollow interior thereof, and this receptacle includes a longitudinally extending sidewall surrounding the interior, a closure forming an upstream end of the receptacle and a dispensing nozzle disposed at a downstream end. The nozzle has a mouth sized to be larger than the granular size of the sand and in fluid communication with the interior. The sidewall is fabricated from a material having sufficient flexibility to allow the receptacle to be squeezed with enough force to cause a cohesive mass of the sand to be forcibly extruded out of the mouth when the nozzle is immersed within a volume of water. A sculpting kit is also provided which further includes a container sized and adapted to include items such as the filled receptacle, an ensemble of tools, a refilling implement and a filter.

U.S. Pat. No. 380,960 to Roger D. Blotsky describes an ornamental design for a bottle in the shape of a letter of the alphabet.

Notwithstanding the prior art, the present invention is neither taught nor rendered obvious thereby.

SUMMARY OF THE INVENTION

The present invention is a book having (a) a front cover, a back cover and a spline, forming an outer portion of a book; (b) a plurality of pages affixed within the outer portion of the book and containing a plurality of words constituting a text; (c) at least one page being a three-dimensional hollow frame structure with its front being at least partially made of see-through material. The frame structure is divided into an upper section and a lower section, separated by a wall having at least one connecting orifice, and containing a trap mechanism at each of said at the connecting orifice, and including a lever functionally connected to the trap mechanism. There is also a plurality of bead-like structures contained within the upper section of said frame structure, having a sufficient shape and size to flow via gravity through the connecting orifice of the upper section to the lower section when a user actuates the lever with the book in a substantially upright position.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

The present invention has been developed to provide a children's book which offers dexterity, logic, educational and entertainment value to the child. Thus, the present invention book devices may be based on nursery rhymes, music and lyrics, short stories, poems, elementary lessons, such as shapes, colors, numbers and letters, or other children's enhancement purposes, as well as a combination of these.

The present invention book devices typically have a front cover, a back cover and a spline to form an outer portion. These three elements may be formed of a single material or separate pieces, both of which are conventional book making methods. The spline and/or covers must include some means for permanently attaching the pages. This could include gluing of cardboard or paper pages, spiral binding, ring binding, or otherwise. The pages of the present invention include some of which have three-dimensional hollow frame structures. These may be constructed in flat planes or may include elevational topography, i.e. depth of field in the frontal plane. In other embodiments, the present invention book may consist of a front page and a back page at least one of which contains the three dimensional hollow frame structure so that the term "book", as used herein, may include a folder, a greeting card or other forms of two page books.

The bead-like materials used in the present invention may be sand, colored sand, plastic beads or other flowable solids. These are maintained in an upper section of the three-dimensional hollow frame structure and are released by opening of one or more traps so that they fall by gravity into a lower section to fill up space which is pre-arranged to create a predetermined image such as a number, a shape, a picture, a portion of a picture, a letter of the alphabet or otherwise, for example, there could be some text and a colored boat with a white area for water in the background with blue beads dropping into the water area to create a colorful water scene.

Figure 1:
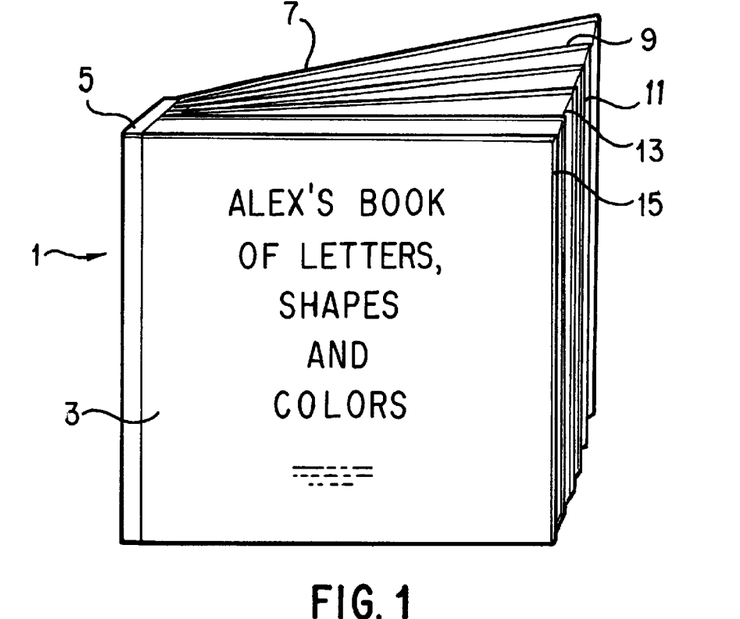
FIG. 1 shows a front view of one embodiment of a present invention book.

Referring now to FIG. 1, there is generally shown a present invention book device 1, which includes a front cover 3, a spline 5, a back 7 and internal pages such as 9, 11, 13 and 15.

Figure 2:
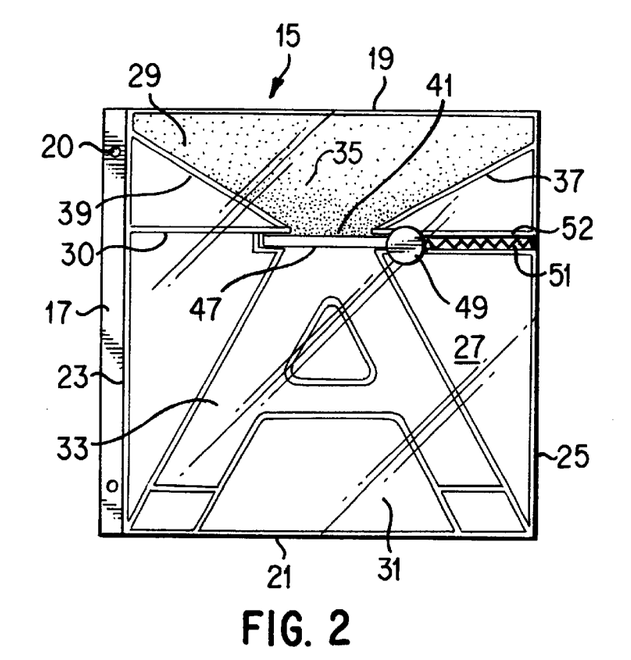
FIG. 2 shows a front view of a present invention novel book page from the present invention book device shown in FIG. 1
Figure 3:
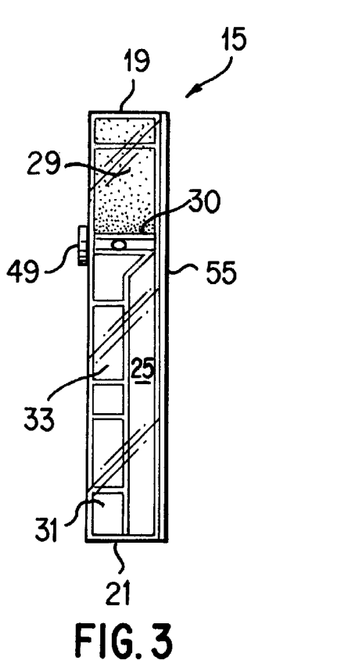
FIG. 3 shows a side view thereof.

FIG. 2 shows a front view of page 15 and FIG. 3 shows a side view thereof FIGS. 2 and 3 show page 15 of present invention book device 1 which has a left side 23, top 19, a bottom 21, a left side 23 and a right side 25. There is a back 55 with a left extended portion 17 having binding holes such as hole 20 for rod binding (similar to ring binders except that the rings are straight rods instead of semicircular). The page 15 is a three dimensional hollow frame structure as shown and may be made of plastic or plastic and cardboard or various types of plastic. For example, back 55 could be cardboard with a plastic back of the hollow frame structure being glued thereto or the back structure itself could be extended to form left extended portion 17. The front surface of back 55 should typically be opaque and should preferably have colors and/or pictures and/or text which can be seen through front 27. Page 15 has an upper section 29 which is divided by a wall 30 which has a connecting orifice 41 therein. Note that slanted base walls 37 and 39 are pitched downwardly toward connecting orifice 41 to enhance gravity flow of bead-like material 35, which could be colored plastic beads or sand or other flowable solid bead-like material. There is a trap 47 and a lever 49 connected to trap 47. It is biased to the left, which is a first, closed position via spring 51 contained in housing 52. When a user slides lever 49 to the right, trap 47 opens connecting orifice 41 and bead-like material 35 flows downwardly into lower portion 31 and move specifically into the void 33 which forms the letter "A". Because of volumetric consideration, upper section 29 is deeper than lower section 31 as shown in FIG. 3 so that there is sufficient bead-like material to fill the voids of lower portion 31. Upper portion 29, all the way down to wall 30 could be covered with cardboard or plastic with printed material so that when lever 49 is pulled, the colorful downwardly flowing bead-like material will be a happy surprise for a child.

Figures 4, 5:
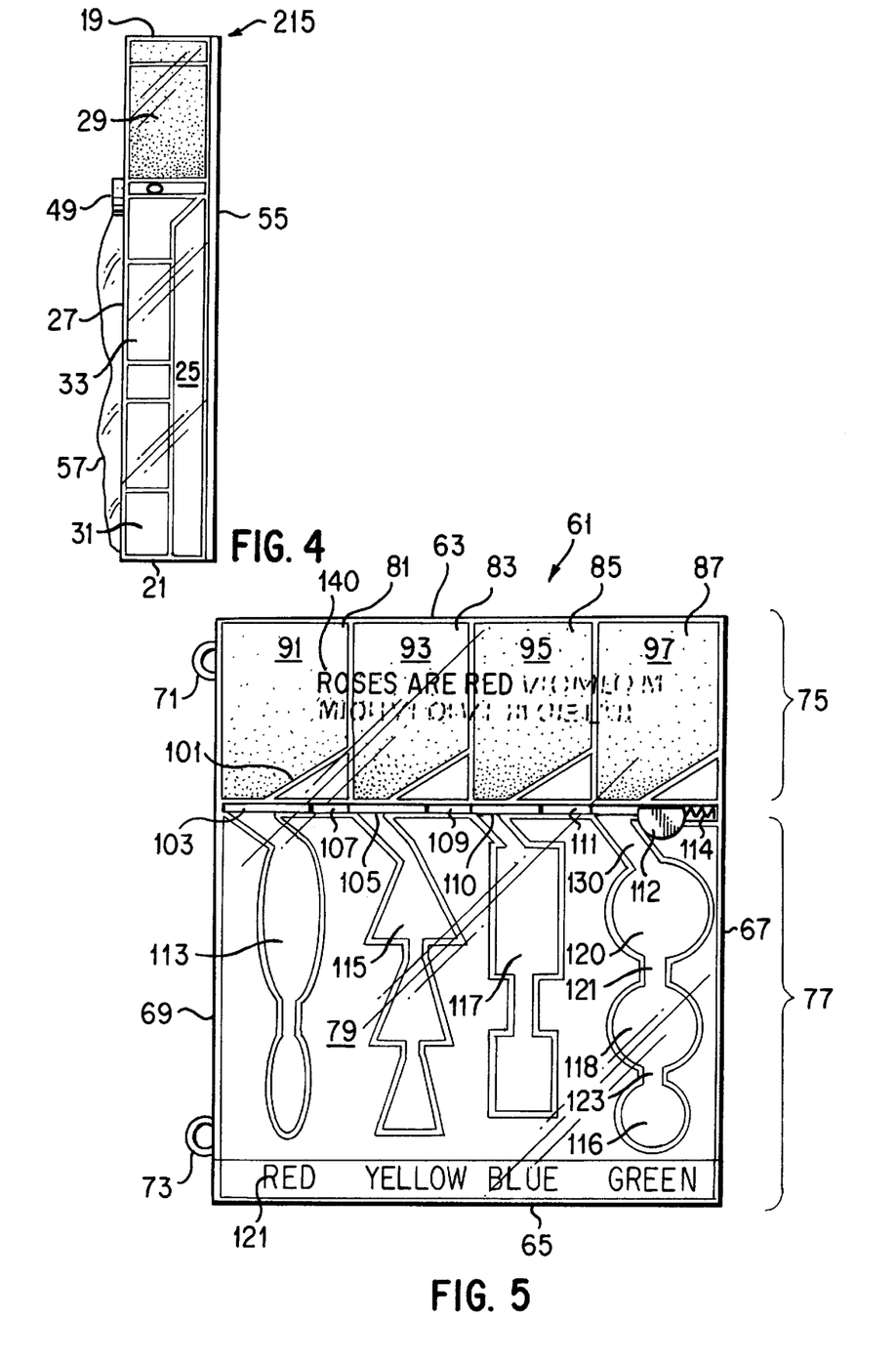
FIG. 4 shows a side view of an alternative embodiment page for a present invention which is similar to the FIG. 3 page, but with elevational topography.
FIG. 5 shows a front view of another alternative embodiment page with a plurality of different colored bead-like materials and corresponding traps and lower section divided area shapes.

FIG. 4 shows an alternative present invention device page 215 which is identical to page 15 of FIG. 3 with identical parts identically numbered except that front 27 includes raised area 57 which creates elevational topography. Thus, there is a raised portion to create a depth of field in the frontal plane. This could, of course, take a pictorial format, in educational format or otherwise.

FIG. 5 shows a front view of an alternative present invention device book page 61 which includes a top 63, a bottom 65, a right side 67, a left side 69, a front 79 and a back (not shown). In this case, upper section 75 has a plurality of separate subsections 91, 93, 95 and 97 connected to various predetermined images in lower section 77 via correspondingly connecting orifices such as orifice 103. Subsection 91 has red beads 81, subsection 93 has yellow beads 83, subsection 95 has blue beads 85 and subsection 97 has green beads 87. Each subsection has a sloped wall such as wall 101 in subsection 91 to enhance gravity flow to its connecting orifice. There is a trap mechanism shown generally as 110 which includes openings 107, 109 and 111. There is a lever 112 connected thereto and a spring 114 biasing trap mechanism 110 to the left. When the user moves lever 112 to the right, this opens all of the traps because the left end of trap mechanism 110, with solid portion such as portion 105 moved to the right opening connecting orifice 103. Likewise, opening 107, 109 and 111 move to the right to correspond connecting orifices for subsections 93, 95 and 97, respectively. Lower section 77 includes elliptic images such as ellipse 113, triangular images such as triangle 115, rectangular images such as rectangle 117 and circular images such as circle 118. Each of these sets of images are openly connected to one another within its set for flow of the colored beads thereto when lever 112 is moved to the right. For example, when lever 112 is moved and held to the right, opening 111 permits flow of green beads 87 from upper section subsection 97 will flow down chute 130 into circle 120, down chute 121, into circle 118, down chute 123 into circle 116. These will all fill up with green beads 85. Again, upper section 75 may have corresponding material and may have print on it such as print 140. The bottom most part of lower section 77 has indicia such as the word "RED" 121 to teach the child to read the name of the color that enters the predetermined shapes above it. Of course, all of the predetermined shapes will fill up with their respective colors simultaneously when lever 112 is activated. Optional words are shown at the bottom, such as word RED 121. Loops 71 and 73 are included for attachment to a book.

As with the page 15 shown in FIGS. 2 and 3 and page 215 shown in FIG. 4, page 61 in FIG. 5 may be reloaded by activating lever 112 and inverting the device so that beads return to the upper section by gravity flow and will be kept there by release of lever 112.

Figure 6:
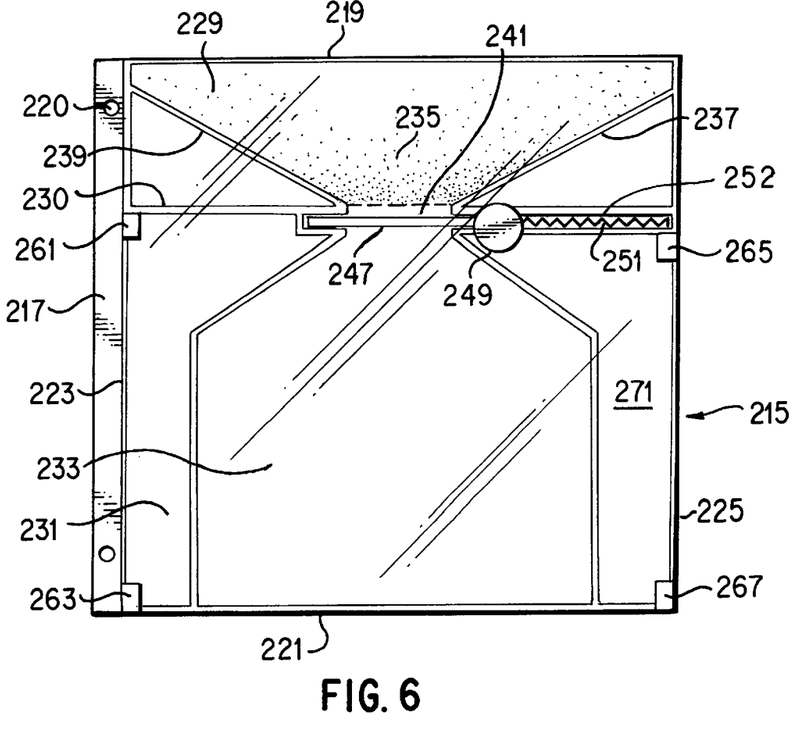
FIG. 6 shows a front view of another alternative embodiment page which is adapted to receive interchangeable image cards; and, FIG. 7 illustrates an example of a card which may be attached to the page shown in FIG. 6.

FIG. 6 shows an alternative embodiment page which accommodates interchangeable cards with drawings and/or text, and including one or more cut-outs so that the dropped bead-like materials will colorize when the page is activated. Thus, FIG. 6 shows a front view of page 215, which includes a left side 223, top 219, a bottom 221, a left side 223 and a right side 225. There is a back (not shown) with a left extended portion 217 having binding holes such as hole 220 for binding. Page 215 is a three dimensional hollow frame structure similar to that shown in FIGS. 2 and 3, and may be made of plastic or plastic and cardboard or various types of plastic. The back of page 215 should typically be opaque and may be simply white or black or other colors, as may be desired, which can be seen through front 271.

Page 215 has an upper section 231 which is divided by a wall 230 which has a connecting orifice 241 therein. Slanted base walls 237 and 239 are pitched downwardly toward connecting orifice 241 to enhance gravity flow of bead-like material 235, which could be colored plastic beads or sand or other flowable solid bead-like material. There is a trap 247 and a lever 249 connected to trap 247. It is biased to the left, in a first, closed position via spring 251 contained in housing 252. When a user slides lever 249 to the right, trap 247 opens connecting orifice 241 and bead-like material 235 flows downwardly into lower portion 231 and move specifically into the void 233. Because of volumetric consideration, upper section 229 has more depth than lower section 231 so that there is sufficient bead-like material to fill the voids of lower section 231. Upper section 229 could be covered with cardboard or plastic with printed material so that when lever 249 is pulled, the colorful downwardly flowing bead-like material will see for the first time by the reader.

Figure 7:
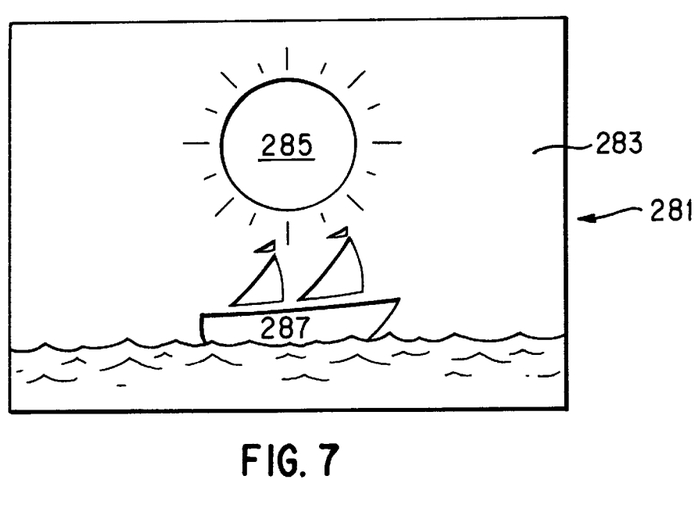

FIG. 7 shows a card which may be used in conjunction with page 215 shown in FIG. 6. More specifically, card 281 may be slid sideways onto page 215 under raised pinch tabs 261, 263, 265 and 267 to securely place it in front of front 271 of page 215 so that when bead-like material 235 drops, it will fill voids 233 so as to show through cut-outs 285 and 287 of picture 283 on card 281. A card with non-vertically aligned cut-outs could be used with a page with multiple upper portioned sub-sections to reveal different colored bead-like material at different cut-out locations on a single card.

Figure 8:
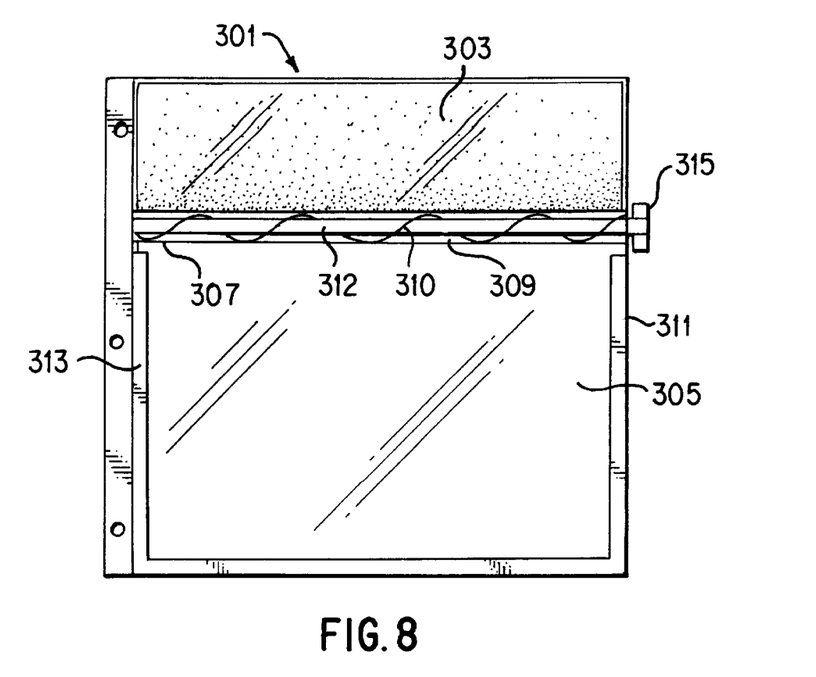
FIG. 8 shows a front view of another alternative embodiment page which permits broadcasting of sand or other bead material across the entire width of the viewing panel lower section.

FIG. 8 shows a present invention book page alternative embodiment 301 which contains an upper section 303 for containing bead-like structures and a lower section 305. Lower section 305 has a clear front and back and has frames with holding sides such as sides 311 and 313 for insertions of templates, pictures, letter, numbers or other presentations on both sides. Divider 307 has an opening 309 with a width substantially equivalent to the width of page 301 so that when slide lever 315 is pulled to the right, bead like material contained in upper section 303 may be broadcast throughout the entire width of lower section 305 and seen from both sides. Spring 310 biases slider 312 to its closed position.

Figure 9:
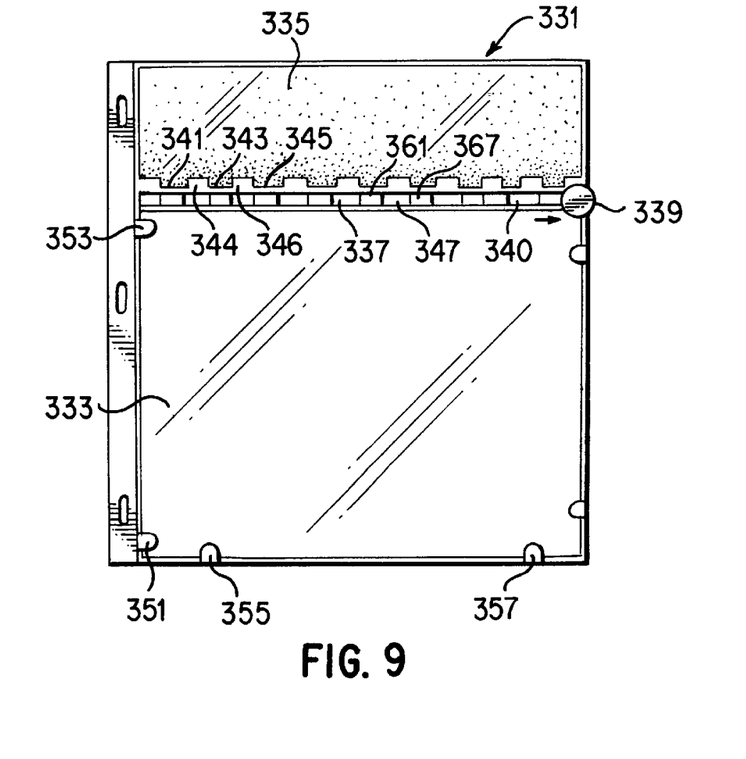
FIG. 9 shows a front view of an alternative embodiment page which has a magnified system for instant disbursement of bead material.

FIG. 9 shows a front view of an alternative embodiment page 331 with upper section 335 and lower section 333. Lower section 333 is clear and has a template holding clasp, such as horizontal clasps 351 and 353 and vertical clasps 355 and 357. Upper section 335 has a manifold made of solid portions such as portions 344 and 346 and openings such as openings 341, 343 and 345. Slider 340 includes closing blocks such as blocks 361 and 367 and openings 337 and 347. Thus, the openings of slider 340 rest under the units of upper section 335 and when slider lever 339 is moved to the right, the openings in slider 340 and the openings in upper section correspond for a manifolding 335 effect which creates instant unloading of the bead-like material.

Figure 10:
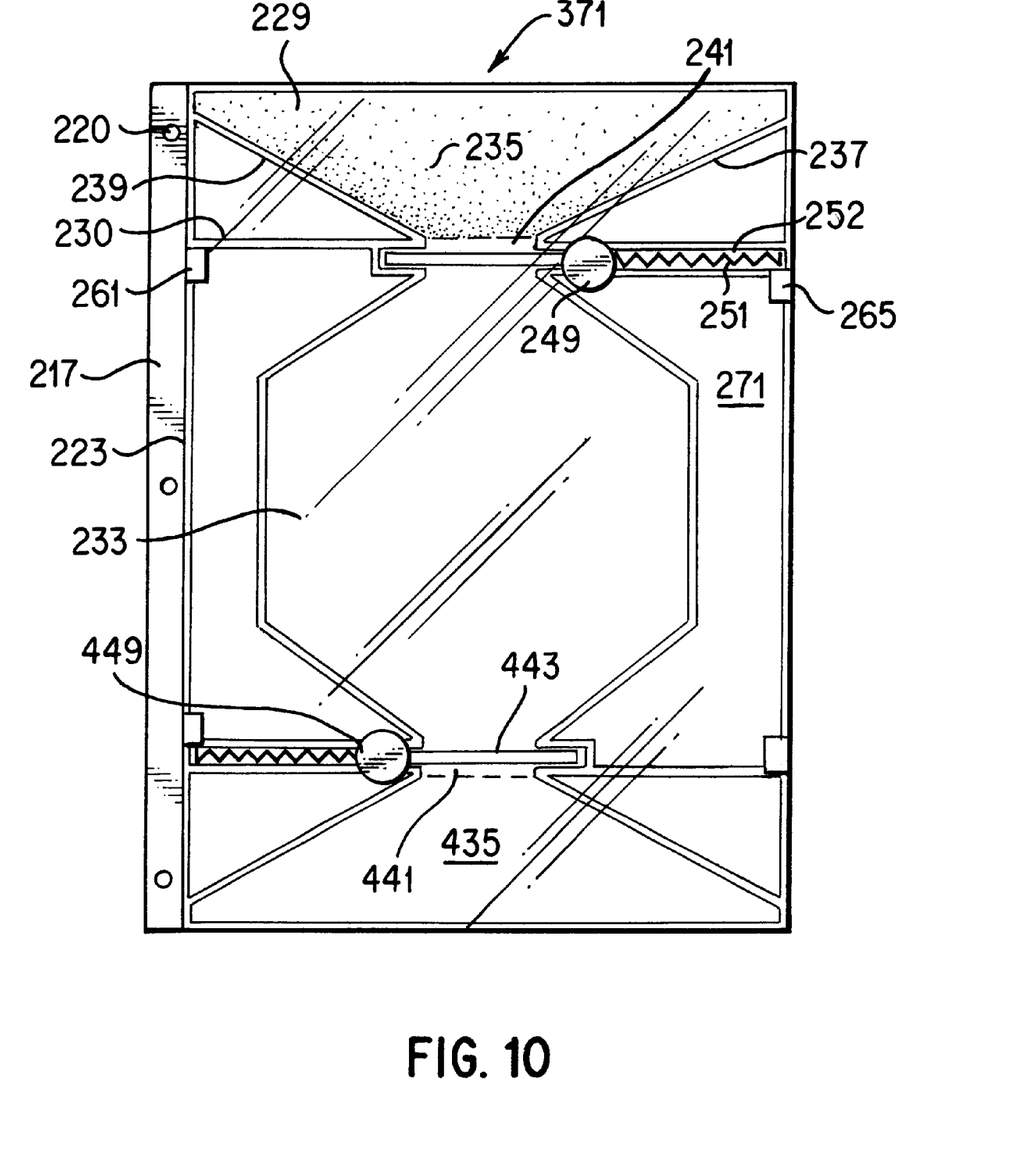
FIG. 10 shows a top-bottom reversible page alternative embodiment with bead material holding sections at both the top and the bottom; and, FIG. 11 shows an alternative embodiment page with multiple slide levers.

FIG. 10 shows another alternative embodiment page 371 with the upper half of the drawing having parts identical to those shown in FIG. 6. Since identical parts are identically numbered, those parts will not be repeated here. Page 371 has a lower half which is the same as the upper half, but upside down. Thus, there is a second feeding orifice 441, slider 443 and slider lever 449 as well as a storage section 435. Thus, a user may unload bead-like material from upper section 229 into void 233 and then by moving lever 449, emptying it into storage section 435, by turning the page upside down the bead-like material in storage section 435 may be then unloaded into void 233 and so on. Alternatively, both upper section 229 and bottom storage section 435 could contain bead-like material of different colors and a user could operate with either mass of bead-like material independent of the other to change colors for the same picture or presentation.

Figure 11:
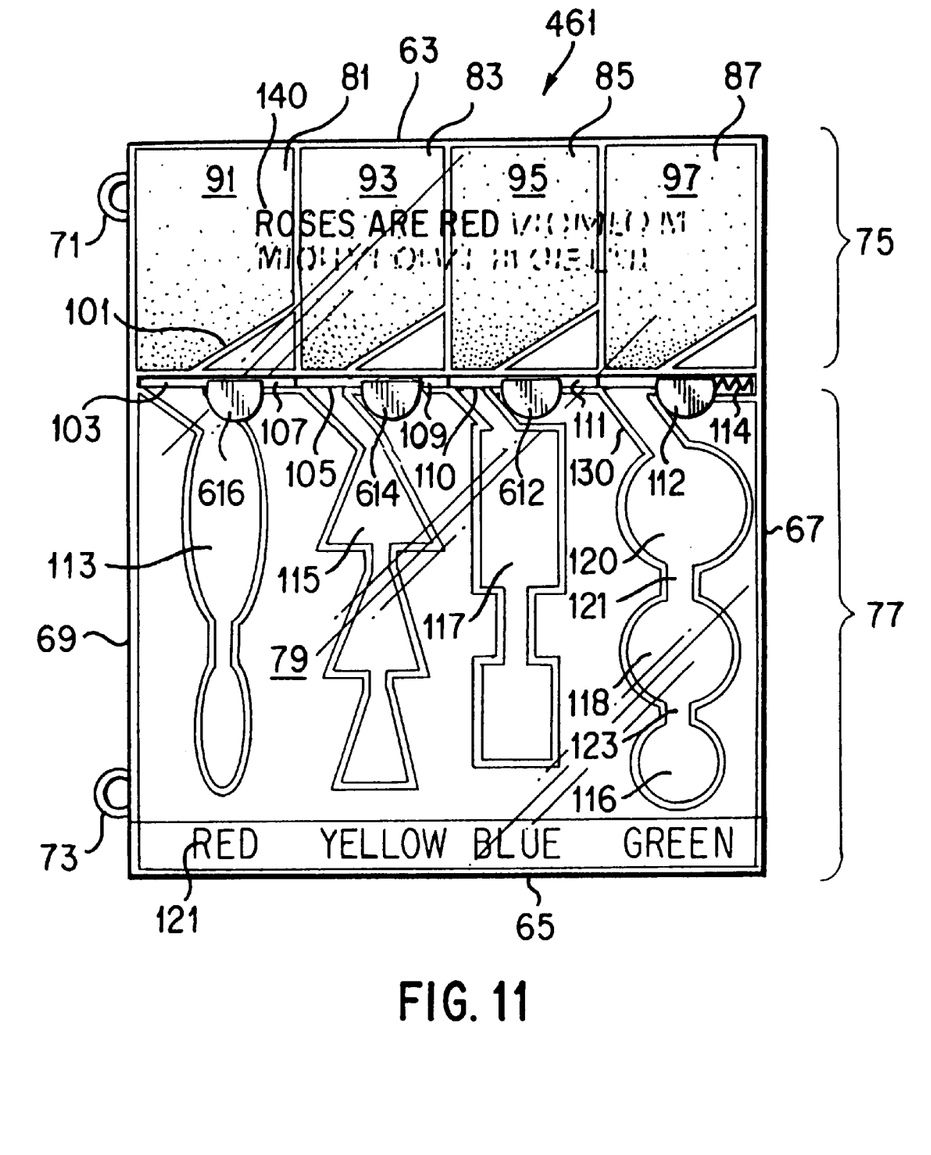

FIG. 11 shows another alternative embodiment page 461 for a present invention book. Page 461 has many features identical to page 61 of FIG. 5 and identical parts are identically numbered and are not repeated in this discussion for FIG. 11. The difference between page 461 of FIG. 11 and page 61 of FIG. 5 is that page 461 has four independent sliders, with levers 112, 612, 614 and 616 which enables users to unload red beads 81, yellow beads 83, blue beads 85 and green beads 87 independently of one another.

Obviously, numerous modifications and variations of the present invention are possible in light of the above teachings. For example, while the upper section is shown in the figures to maintain the bead-like material and the lower section is used to present an image in the alternative, both the upper section and the lower section could have images and the bead-like material could be shuttled back and forth between the upper section and the lower section by repeated inversion and release without exceeding the scope of the present invention. Further, instead of up and down images, front and back images could be utilized without exceeding the scope of the present invention. It is therefore understood that within the scope of the appended claims, the invention may be practiced otherwise than as specifically described herein.

What is claimed is:

1. A book which comprises:
    (a) a front cover, a back cover and a spline, forming an outer portion of a book;
    (b) at least one page affixed within said outer portion of said book and containing a plurality of words constituting a text;

(c) at least one of said at least one page being a three-dimensional hollow frame structure have a front, a back, sides, a top and a bottom, said front being at least partially made of see-through material, said frame structure being divided into an upper section and a lower section, said upper section and said lower section being separated by a separation wall having at least one connecting orifice, and further containing a trap mechanism at each of said at least one connecting orifice, and further including at least one lever functionally connected to said trap mechanism, said trap mechanism having a first, closed position, and having a second, open position, with said lever and said trap mechanism being biased such that said trap mechanism is in said first, closed position;

(d) a plurality of bead-like structures contained within said upper section of said frame structure, and having a sufficient shape and size to flow via gravity through said upper section to said lower section;

whereby a user may read said book in a substantially upright position and actuate said lever to move said trap from said first, closed portion to said second, open position so as to release said plurality of bead-like structures from said upper section to said lower section to create a visual image in said lower section.

2. The book of claim 1 wherein said lower section of the frame structure has conforming components which forms a pre-determined recognizable image such that when said plurality of bead-like structures enters said lower section, said plurality of bead-like structures conform to the shape of said image.

3. The book of claim 2 wherein said conforming components form a letter of the alphabet.

4. The book of claim 2 wherein said conforming components form at least a part of a recognizable picture.

5. The book of claim 1 wherein said lower section of said frame structure contains at least one divider so as to form a plurality of sub-sections within said lower section, and having at least one connecting orifice corresponding to each such subsection so formed.

6. The book of claim 1 wherein said lower section of said frame structure is adapted to permit movement of said plurality of bead-like structures from said lower section back to said upper section when said book is inverted and said lever is actuated.

7. The book of claim 1 wherein said frame structure is formed of plastic.

8. The book of claim 1 wherein said plurality of bead-like structures is selected from a group consisting of sand, colored sand and plastic beads.

9. The book of claim 1 wherein said text is selected from a group consisting of stories, instructional information, educational information, and rhymes.

10. The book of claim 5 wherein said lower section of said frame structure is divided to illustrate fraction concepts.

11. A book which comprises:

(a) a front cover, a back cover and a spline, forming an outer portion of a book;

(b) a plurality of pages affixed within said outer portion of said book and containing a plurality of words constituting a text;

(c) at least one of said plurality of pages being a three-dimensional hollow frame structure having a front, a back, sides, a top and a bottom, said front being at least partially made of see-through material, said frame structure being divided into an upper section and a lower section, said upper section and said lower section being separated by a separation wall having at least one connecting orifice, and further containing a trap mechanism at each of said at least one connecting orifice, and further including at least one lever functionally connected to said trap mechanism, said trap mechanism having a first, closed position, and having a second, open position, with said lever and said trap mechanism being biased such that said trap mechanism is in said first, closed position;

(d) a back support member for each of said at least one frame structure, said support member being permanently attached to said frame structure;

(e) a plurality of bead-like structures contained within said upper section of said frame structure, and having a sufficient shape and size to flow via gravity through said connecting orifice of said upper section to said lower section;

whereby a user may read said book in a substantially upright position and actuate said lever to move said trap from said first, closed portion to said second, open position so as to release said plurality of bead-like structures from said upper section to said lower section to create a visual image in said lower section.

12. The book of claim 11 wherein said lower section of the frame structure has conforming components which forms a pre-determined recognizable image such that when said plurality of bead-like structures enters said lower section, said plurality of bead-like structures conform to the shape of said image.

13. The book of claim 12 wherein said conforming components form a letter of the alphabet.

14. The book of claim 12 wherein said conforming components form at least a part of a recognizable picture.

15. The book of claim 11 wherein said lower section of said frame structure contains at least one divider so as to form a plurality of subsections within said lower section, and having at least one connecting orifice corresponding to each such subsection so formed.

16. The book of claim 11 wherein said lower section of said frame structure is adapted to permit movement of said plurality of bead-like structures from said lower section back to said upper section when said book is inverted and said lever is actuated.

17. The book of claim 11 wherein said frame structure includes means for attaching cards temporarily to said front of said frame structure and wherein said book further includes a plurality of cards for attachment and removal to and from said front of said frame structure, and wherein each of said cards has at least one portion which renders the front of said frame structure visible when said card is attached thereto.

18. The book of claim 11 wherein said plurality of bead-like structures is selected from a group consisting of sand, colored sand and plastic beads.

19. The book of claim 11 wherein said text is selected from a group consisting of stories, instructional information, educational information, and rhymes.

20. The book of claim 15 wherein said lower section of said frame structure is divided to illustrate fraction concepts.

* * * * *